United States Patent [19]
Schmode et al.

[11] Patent Number: 5,331,742
[45] Date of Patent: Jul. 26, 1994

[54] END CUTTERS

[75] Inventors: Hartmut Schmode, Blomberg; Gerd Weber, Detmold; Ulrich Wiebe, Dörentrup, all of Fed. Rep. of Germany

[73] Assignee: Weidmüller Interface GmbH & Co., Detmold, Fed. Rep. of Germany

[21] Appl. No.: 35,171

[22] Filed: Mar. 22, 1993

[30] Foreign Application Priority Data

Mar. 24, 1992 [DE] Fed. Rep. of Germany ....... 4209530

[51] Int. Cl.$^5$ .................. B26B 17/00; B26B 17/02
[52] U.S. Cl. ........................................ 30/245; 30/250
[58] Field of Search ............... 30/187, 244, 245, 246, 30/250; 72/409, 410

[56] References Cited

U.S. PATENT DOCUMENTS

| | | |
|---|---|---|
| 3,324,702 | 7/1967 | Malkin . |
| 4,050,153 | 9/1977 | Flisch ................................ 30/250 |
| 4,223,439 | 9/1980 | Rommel ............................ 30/250 |
| 4,677,748 | 7/1987 | Kobayashi ........................ 30/250 |
| 5,074,142 | 12/1991 | Heskey et al. ................... 72/410 |

FOREIGN PATENT DOCUMENTS

| | | |
|---|---|---|
| 2910544 | 9/1980 | Fed. Rep. of Germany . |
| 8219141 | 7/1982 | Fed. Rep. of Germany . |
| 2745114 | 1/1983 | Fed. Rep. of Germany . |
| 3302875 | 11/1987 | Fed. Rep. of Germany . |
| 148504 | 4/1921 | Italy . |

Primary Examiner—Richard K. Seidel
Assistant Examiner—Paul M. Heyrana, Sr.

[57] ABSTRACT

The invention relates to end cutters, in particular for cutting through cables, having two flat loose blades which are located one on top of the other, and rotatable about a common rotation shaft and can be driven by means of a drive device. Each loose blade is in this case acted on by a suitable cam disc which is located in the plane of the blade and is coupled to the drive device. A desired force response while cutting up material in the form of ropes can be achieved in a simple manner by selection of the radii of the cam discs.

21 Claims, 2 Drawing Sheets

END CUTTERS

BACKGROUND OF THE INVENTION

1. Field of the Invention

The invention relates to end cutters wherein loose blades can be driven by a dedicated cam disc located in a plane of the blade and coupled to the drive device.

2. Description of Background Art

End cutters are disclosed in DE 27 45 114 C2. These known end cutters, which are particularly suitable for cutting through cables, have two flat loose blades which are located one on top of the other which can rotate about a common rotation shaft and can be driven by means of a drive device. The drive device contains a piston which is arranged in a bushing which is acted on by pressure fluid. Each of the loose blades is connected in an articulated manner to the piston via a toggle lever.

DE 33 02 875 C2 furthermore discloses shears for splitting material in the form of ropes which are to be cut. In this case, only one blade of the shears is constructed as a loose blade, while the other blade of the shears is a fixed blade. The fixed blade is firmly mounted on a retaining lever on which a pivoting lever is articulated in order to drive the loose blade with the aid of a ratchet, whose pawl engages in a toothed rim on the circumference of the loose blade. The pawl can also engage in a ratchet pinion, which for its part drives the loose blade.

SUMMARY AND OBJECTS OF THE INVENTION

The invention is based on the object of developing end cutters of the type mentioned initially such that the loose blades can be driven by a transmission which rotates itself.

The solution of the defined object is to provide end cutters wherein loose blades can be driven by a dedicated cam disc located in a plane of the blade and coupled to the drive device.

End cutters according to the invention are distinguished in that each loose blade can be driven by a dedicated cam disc which is located in the plane of the blade and is coupled to the drive device.

If the cam discs are caused to rotate, the rotational positions of the respective loose blades can be set individually by said discs in order to be able to open and close the mouth of the pliers of the end cutters. Pneumatically operated toggle levers for driving the loose blades, as are used in the end cutters mentioned initially, are thus no longer necessary, which very considerably simplifies the construction of the end cutters according to the invention.

According to an advantageous refinement of the invention, each loose blade has a convex region which is located on the side of the rotation shaft facing away from the blade cutter of the loose blade and presses against the circumference of the cam disc.

The convex region thus extends in a direction opposite to the tip of the loose blade and is located on the circumference of the cam disc. One of the cam discs can in this case be rotated such that its circumferential section, which touches the convex region of the loose blade, runs away from the rotation shaft of the loose blades, while the other cam disc can be rotated such that its circumferential section which touches the convex region of the other loose blade runs towards the rotation shaft of the loose blades. In the last-mentioned case, care must be taken to ensure that no self-locking occurs between the cam disc and the convex region. Such self-locking can be prevented by means of a sufficiently flat gradient of the cam disc.

In the case described, the cam discs rotate in the same direction, which is advantageous since the drive device may then have a simple construction. The shape of the cam discs can be selected such that a desired force response is achieved during the cutting process, as a function of the position of the loose blades.

According to another advantageous refinement of the invention, both cam discs are arranged in a rotationally locked manner on a common drive shaft, resulting in yet another simplification of the drive device.

A drive mechanism which, for example, can be coupled to one end of the drive shaft, can be connected to the said drive shaft.

This drive mechanism may be a manually operable control wheel by means of which the loose blades can be moved into a desired position, or even a motor, for example an electric motor, by means of which the loose blades can be driven in order to carry out a cutting process.

According to yet another refinement of the invention, the drive device may have a drive gearwheel which is arranged on the drive shaft in a rotationally locked manner. The drive gearwheel may preferably be located between the cam discs, in order to design the construction of the end cutters to be as compact as possible.

According to an advantageous development of the invention, the drive device has a drive latch, which engages with a drive pawl between the teeth of the drive gearwheel and is articulated on a pivoting arm. The drive gearwheel and, with it, the cam discs can then be driven via the drive latch by operating the pivoting arm, so that a corresponding displacement of the loose blades takes place. A blocking latch which is attached to a retaining arm engages in a sprung manner between the teeth of the drive gearwheel in order to prevent this gearwheel, and hence the loose blades, being reset.

The drive pawl and blocking latch may engage in a positively-locking manner between the teeth of the drive gearwheel in order to ensure better force transmission with less risk of wear.

BRIEF DESCRIPTION OF THE DRAWINGS

An exemplary embodiment of the invention is described in more detail in the following text, making reference to the drawings, in which.

DETAILED DESCRIPTION OF THE INVENTION

Figure 1:
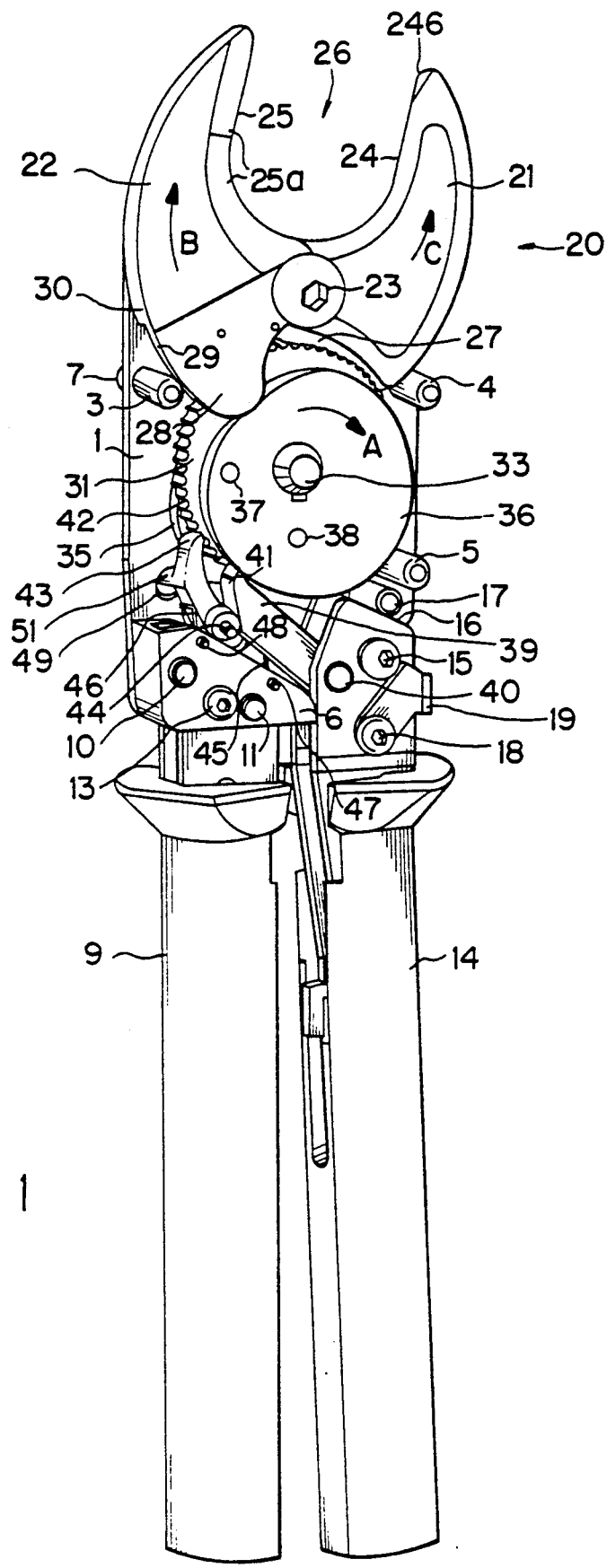
FIG. 1 shows a perspective representation of the end cutters from behind with the housing open.
Figure 2:
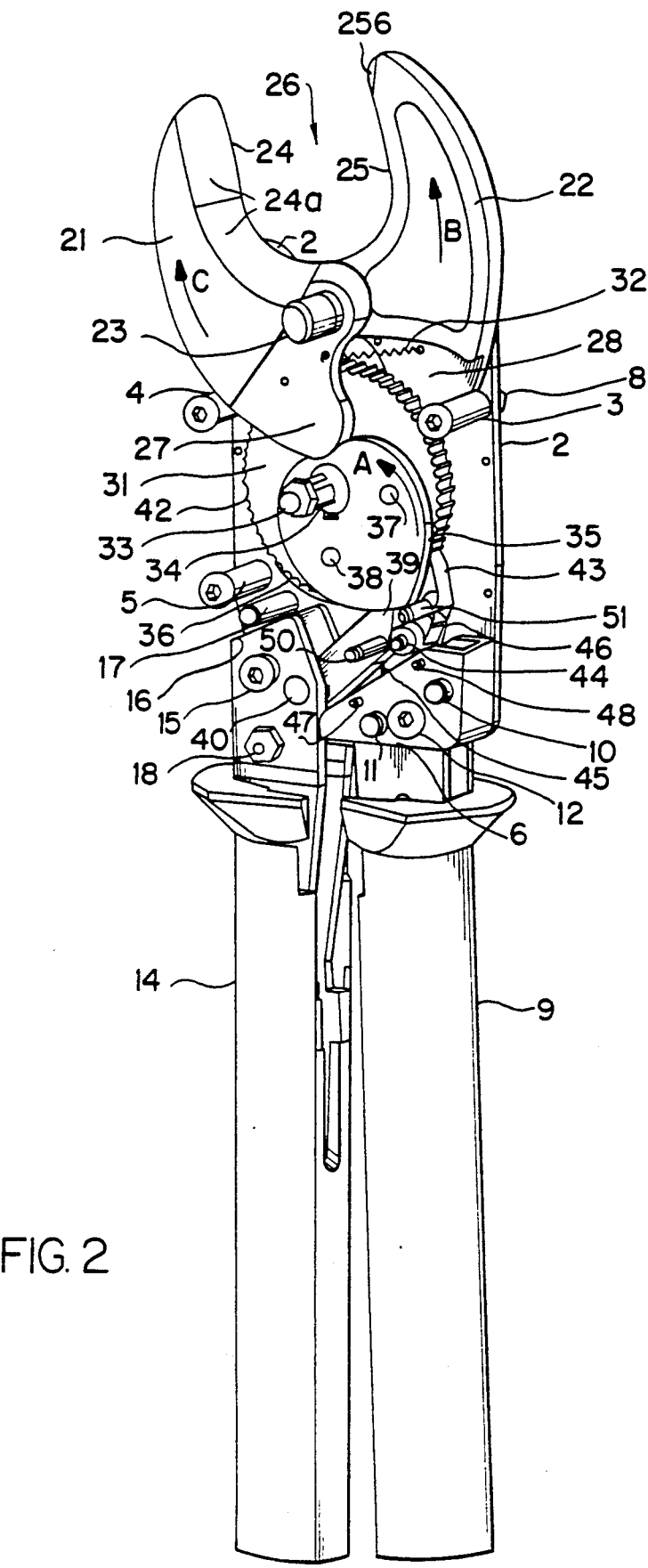
FIG. 2 shows a perspective representation of the end cutters from the front, with the housing open.

In accordance with FIGS. 1 and 2, the end cutters according to the invention have a front housing plate 1 and a rear housing plate 2. The two housing plates 1 and 2 are constructed in an essentially rectangular shape and are located parallel to one another at a distance, being connected to one another via spacers 3, 4, 5 and 6. The spacers 3, 4, 5 and 6 are located in pairs in the side region of the housing plates 1 and 2, the spacers 3, and 5 being constructed as spacer sleeves with an internal thread, which hold screws 7, 8 on both sides, which screws are passed through passages in the housing plates 1, 2.

The spacer 6 is located in a corner region of the housing plates 1, 2 and has an essentially triangular shape, the hypotenuse being directed inwards. It has a U-shaped cross-sectional profile and is used for holding a retaining arm 9 which is connected via two attachment pins 10 and 11 in a positively-locking manner to the spacer 6. The attachment pins 10 and 11 in other words run both through an upper end of the retaining arm 9 and through the spacer 6, in order to connect both parts firmly to one another. Furthermore, the attachment pins 10 and 11 also pass through both housing plates 1 and 2, in order to lock the spacer 6 and hence the retaining arm 9 with respect to the housing plates 1 and 2. The axial ends of the attachment pins 10 and 11 are aligned with the outside of the housing plates 1 and 2. In order to attach the housing plates 1 and 2 in the region of the spacer 6 to its two sides, threaded holes 12 are furthermore provided which hold screws 13, which pass through passages in the housing plates 1 and 2 and, by means of their screw head, draw these plates against the spacer 6. If the retaining arm 9, which consists, for example, of steel, has a U-shaped profile, then it can be reinforced in its upper region by means of an internally located spacer, through which the elements 10, 11 and 13 are then likewise passed. The threaded hole 12 can also extend into the region of the internally located spacer and can be constructed, for example, as a throughhole.

Located adjacent to the retaining arm 9 is a pivoting arm 14, which is articulated on the housing plates 1 and 2 via a hinge bolt 15, such that it can rotate. The hinge bolt 15 runs at right angles through the housing plates 1 and 2, its axial end surfaces being aligned with the outsides of the housing plates 1 and 2. The pivoting arm 14 is pressed back about the hinge bolt 15 by the retaining arm 9, with the aid of a spring, which is not shown and, in terms of its effect, is located between the retaining arm 9 and the pivoting arm 14.

In the region of the hinge bolt 15, that is to say in its upper region, the pivoting arm 14 has a U-shaped cross-sectional profile and, on its upper end, it has a bevelled edge 16 by means of which it strikes against a stop pin 17 when it has been pivoted to the furthest extent with respect to the retaining arm 9. In other words, the stop pin 17 limits the pivoting movement of the pivoting arm 14 away from the retaining arm 9. The stop pin 17 is supported in both housing plates 1 and 2.

Located at the upper end of the pivoting arm 14 is, furthermore, a locking latch 19, which can rotate about a bearing pin 18 and can be turned into a corresponding recess in the rear housing plate 2 when the retaining arm 9 and pivoting arm 14 are located closely adjacent to one another, in order to prevent pivoting of the pivoting arm 14 as a result of the said spring, which is located between the retaining arm 9 and the pivoting arm 14. The retaining arm 9 and the pivoting arm 14 are sheathed, for example, by plastic at their lower end, in order to form handles.

Before describing the latch drive of the end cutters in more detail, it is intended to describe its construction in the upper region in detail first.

Located in this upper region, which is remote from the retaining arm 9 and the pivoting arm 14, is a shear head 20, which has a front loose blade 21 and a rear loose blade 22. The two loose blades 21 and 22 can rotate about a common rotation shaft 23, which is supported at the ends in the housing plates 1 and 2.

The loose blades 21 and 22 have cutting edges 24 and 25 which are bent in a semicircular shape, point towards one another and, together, form a mouth 26 of the pliers of the end cutters. Roughly speaking, the loose blades 21 and 22 are of sickle-like construction, the rotation shaft 23 coming to rest at a short distance underneath the mouth 26 of the pliers. As a consequence of the sickle-like construction of the loose blades 21 and 22, said blades still extend, however, beyond the rotation shaft 23 in the direction of the arms 9 and 14, the ends of the loose blades 21 and 22 pointing towards the arms 9 and 14 being chamfered and foxing convex regions 27 and 28 there.

FIG. 1 shows a view of that surface of the rear loose blade 22 on which a ground surface 25a is located in order to form the cutting edge 25. In contrast, FIG. 2 shows a view of that surface of the front loose blade 21 on which a ground surface 24a is located in order to form the cutting edge 24. The loose blades 21 and 22 are constructed in the form of discs and are relatively thick in the region of the cutting edges 24 and 25, while they are thinner in the convex regions 27, 28, for which purpose their wall surfaces are correspondingly cut away, to be precise on the mutually opposite, or mutually facing sides. This can best be seen in FIG. 1, where the wall thickness of the loose blade 22 is thinner in the region of the reference symbol 29 than in the region of the reference symbol 30. As a consequence of the cut-away wall surfaces, a cavity is produced between the convex regions 27, 28, which cavity is used for holding a drive gearwheel 31.

It should also be mentioned that both loose blades 21 and 22 are prestressed with the aid of a tension spring 32, to be precise such that the tension spring 32 tries to move the convex regions 27, 28 about the rotation shaft 23 towards one another.

The drive gearwheel 31 is arranged in a rotationally locked manner on a drive shaft 33 whose axial ends are supported in the housing plates 1 and 2. The drive shaft 33 is in this case passed through the front housing plate 1 to the front and has a polygon 34 there, by means of which a drive mechanism, which is not shown, can be coupled, for example a manually operated control wheel or a motor, in order to rotate the drive shaft 33. The drive mechanism in this case comes to rest on the outside of the front housing plate 1.

Two cam discs are furthermore arranged on the drive shaft 33, to be precise a front cam disc 35 and a rear cam disc 36, each of which comes to rest on one side of the drive gearwheel 31. The gearwheel 31 and the cam discs 35, 36 are located directly one on top of the other and are connected to one another in a rotationally locked manner, for example with the aid of pins which pass through common passages 37, 38 in the parts 31, 35 and 36. If the drive shaft 33 is rotated from the outside via the drive mechanism, then the two cam discs 35 and 36 as well as the drive gearwheel 31 are driven in the same direction. There is no relative movement between them. The overall axial width of the drive gearwheel 31, cam disc 35 and cam disc 36 is in this case so large that this unit comes to rest in a fitting manner between the housing plates 1 and 2. The axial width of this unit thus corresponds to the distance between the housing plates 1 and 2, and to the length of the spacers 3, 4, 5 and 6. However, in this case, the cam discs can still rotate between the housing plates 1 and 2 and are thus not clamped in.

As already mentioned, the mutually facing side walls of the loose blades are cut away in the convex regions 27 and 28 in order to create a cavity for holding the drive gearwheel 31, the convex regions 27, 28 being brought into contact on the sides opposite it. In the convex regions 27, 28, the thickness of the loose blades corresponds to the axial thickness of the cam discs 35, 36. In other words, the loose blades 21 and 22 also come to rest in a fitting manner between the housing plates 1 and 2, to be precise also where the convex regions 27 and 28 are located. It should be mentioned here that the convex regions 27, 28 need not always be located at the sides with respect to the drive gearwheel 31. This depends on the rotational position of the loose blades 21, 22, as is still to be described.

Seen in the longitudinal direction of the end cutters, the drive shaft 33 is located underneath the rotation shaft 23, it being possible to see in FIG. 1 that the convex region 28 of the rear loose blade 22 presses onto the circumference of the rear cam disc 36 while, according to FIG. 2, the convex region 27 of the front loose blade 21 presses on the circumferential region of the front cam disc 35. The convex regions 27, 28 are guided against the cam discs 35, 36 with the aid of the already-mentioned tension spring 32. If the cam discs 35, 36 rotate as a consequence of the rotation of the drive shaft 33, which can be driven either via the drive gearwheel 31 or via the said drive mechanism, then in this case the loose blades 21, 22 are also pivoted. This will be described more precisely later.

It has already been explained that the drive shaft 33 can be rotated with the aid of the said drive mechanism in order in this way to move the loose blades 21, 22. However, the drive shaft 33 can also be rotated via the drive gearwheel 31, to be precise with the aid of a drive latch 39, which is supported by means of a bearing pin 40 in the upper region of the pivoting arm 14, such that it can pivot. In this case, the drive latch 39 has a drive pawl 41 which engages between two teeth 42 of the drive gearwheel 31. Its engagement point is on the side of the drive shaft 33 on which the retaining arm 9 is located. A blocking latch 43 also engages on this side between the teeth 42 of the drive gearwheel 31, which blocking latch 43 is supported on a bearing pin 44 such that it can rotate, the axial ends of the bearing pin 44 depositioned in the housing plates 1 and 2. The drive latch 39 and the blocking latch 43 are prestressed in the direction of the drive gearwheel 31 with the aid of springs 45 and 46. These springs 45, 46 are supported at their other end on the spacer 6 and are wound around pins 47, 48 centrally, which pins 47, 48 pass through the spacer 6 in its U-shaped region. The pins 47, 48 are also supported in the housing plates 1 and 2.

Located in the front housing plate 1 are openings 49 through which control levers 50, 51 pass, of which one is connected at the side to the drive latch 39 and the other is connected at the side to the blocking latch 43. The openings 49 are elongated hole openings, so that, in the event of movement of the control levers 50, 51, the drive latch 39 and the blocking latch 43 can be removed from the drive gearwheel 31 against the force of the springs 45, 46. They can be raised off the drive gearwheel 31 together or separately, so that it can also be moved by hand to preset the loose blades 21, 22, to be precise via the already described control wheel.

The method of operation of the end cutters is described in more detail in the following text, making reference to FIGS. 1 and 2.

If the end cutters are located in an initial position which is shown in FIGS. 1 and 2 and in which the arms 9 and 14 are located adjacent to one another, then the securing latch 19 is initially rotated about the bearing pin 18 in FIG. 1 in the clockwise direction, to be precise by hand, in order to release the pivoting arm 14. The pivoting arm 14 is then pivoted away from the retaining arm 9 with the aid of the spring, which is not shown and is located between the arms 9 and 14, to be precise about the hinge bolt 15. In this case, the bearing pin 40 is also moved on a track about the hinge bolt 15, driving the drive latch 39 whose drive pawl 41 thereupon slides away via the teeth 42 of the drive gearwheel 31. FIG. 1 shows that, in this case, the driven rotation of the drive gearwheel 31 is prevented by the blocking latch 43 which, as a consequence of the force of the spring 46, engages in the toothed region of the drive gearwheel 31 and blocks said drive gearwheel 31. Thus, if the pivoting arm 14 is pivoted away from the retaining arm 9, then in FIG. 1 no rotation of the drive gearwheel 31 takes place in the counterclockwise direction, and hence also no rotation of the cam discs 35 and 36. The pivoting arm 14 pivots until its upper bevelled edge 16 strikes against the stop pin 17.

If, subsequently, the pivoting arm 14 is rotated about the hinge bolt 15 towards the retaining arm 9, it thus presses the drive latch 39 forwards which, for its part, rotates the drive gearwheel 31 in the clockwise direction about the drive shaft 33, via the drive pawl 41. In this case, the blocking latch 43 merely slides away over the teeth 42 of the drive gearwheel 31, without blocking it. The cam discs 35 and 36 are also rotated in the clockwise direction in FIG. 1 with the rotation of the drive gearwheel 31. The size of the rotation angle corresponds to the pivoting angle of the pivoting arm 14 and is normally equal to the angular separation between two teeth 42.

If, in FIG. 1, the cam disc 36 rotates in the clockwise direction, that is to say in the direction of the arrow A, then that section of its circumferential region always moves on which the convex region 28 of the rear loose blade 22 comes to rest, essentially towards the rotation shaft 23. In other words, the rear cam disc 36 presses the rear loose blade 22 to a greater or lesser extent upwards above the convex region 28, and around the rotation shaft 23. The rotational position of the rear loose blade 22 is thus governed by the radius of the cam disc 36, which is always selected such that no self-locking or sticking of the cam disc 36 and the convex region 28 can occur. In FIG. 1, the rear loose blade 22 is pivoted about the rotation shaft 23 as far to the rear as possible and in the counterclockwise direction, since the convex region 28 touches the cam disc 36 on a circumferential section which is at the shortest distance from the drive shaft 33. In the event of further rotation of the cam disc 36 and increasing cam disc radius, the rear loose blade 22 is then pressed in the direction of the arrow B.

With the rotation of the cam disc 36 in FIG. 1 in the direction of the arrow A, the front cam disc 35 in FIG. 2 is also driven in the same rotation direction, that is to say also rotated in the direction of the arrow A, which here, however, is drawn in in the opposing sense, since FIG. 2 represents a front view of the end cutters.

The convex region 27 of the front loose blade 21 is located on the circumference of the front cam disc 35, so that, during rotation of the front cam disc 35 in the direction of the arrow A, the front loose blade 21 in FIG. 2 is rotated about the rotation shaft 23 in the clockwise direction, its rotational position once again depending on the radius of the cam disc 35. In FIG. 2, the front loose blade 21 occupies its position where it is pivoted downwards as far as possible, since the convex region 27 there comes to rest on the front cam disc 35, where this has its smallest radius. If, on this basis, the front cam disc 35 rotates in the direction of the arrow A, then it presses the front loose blade 21 over the convex region 27 in the direction of the arrow C, in order to close the mouth 26 of the pliers, since, at the same time, the rear loose blade 22 is pressed by the rear cam disc 36 in the direction of the arrow B. In order to achieve this, the rotational positions of the cam discs 35 and 36 are fixedly selected relative to the drive gearwheel 31 from the start.

In order to prevent, in the case of thicker cross-sections of the material which is to be cut, the tips of the cutting edges 24, 25 crossing one another, said cutting edges 24, 25 have bevels 24b, 25b on the side surfaces opposite the ground surfaces 24a and 25a. Said bevels are in practice used for guiding the loose blade tips when they start to overlap one another.

If the drive latch 39 and the blocking latch 43 are rotated out of the toothed region of the drive gearwheel 31 via the control levers 50, 51, then the unit which consists of the cam disc 35, drive gearwheel 31 and cam disc 36 can also be rotated by hand, to be precise by means of a handwheel which is seated on the polygon 34, in order to be able to open and close the mouth 26 of the pliers in the desired manner on rotation of the handwheel.

The pivoting angles of the loose blades 21 and 22 can be preset by means of the radii of the cam discs, in order in this way to produce predetermined cutting forces for successive rotational positions of the drive gearwheel 31. Material in the form of ropes can then be cut up with a desired force response which is dependent on the rotational position, which is advantageous particularly in the case of cables, which have a relatively soft insulation and a harder core. The radii of the cam discs can in this case be selected such that the mouth of the pliers is initially closed more quickly for identical angular steps of the drive gearwheel 31, since only soft insulation has to be cut up, while subsequently, a slower movement of the loose blades 21, 22 takes place per angular step of the drive gearwheel 31, since the hard cable core is now being cut up. The end cutters are also particularly suitable for cutting up cables which are laid in corners, since they have only a small structural width. The end cutters can also be sealed in the end region of the drive gearwheel 31 and of the cam discs 35, 36 in order to provide protection against contamination of the transmission. For this purpose, side wall regions can be located between the housing plates 1, 2, for example between the spacers 4, 5 on the one hand and 3, 6 on the other hand.

We claim:

1. End cutters, especially for cutting through cables, comprising:
   two flat loose blades operatively positioned one on top of the other, said blades being rotatably mounted about a common rotation shaft and being selectively driven by means of a drive device; each loose blade being selectively driven by a dedicated cam disc located in the plane of the blade and being operatively coupled to the drive device.

2. End cutters according to claim 1, wherein each loose blade includes a convex region located on a side of the rotation shaft facing away from a blade cutter of the loose blade and pressing against the circumference of the cam disc.

3. End cutters according to claim 2, wherein both cam discs are arranged in a rotationally locked manner on a common drive shaft.

4. End cutters according to claim 1, wherein both cam discs are arranged in a rotationally locked manner on a common drive shaft.

5. End cutters according to claim 4, wherein the drive device includes a drive gearwheel which is arranged on the drive shaft in a rotationally locked manner.

6. End cutters according to claim 5, wherein the drive gearwheel is located between the cam discs.

7. End cutters according to claim 6, wherein the drive device includes a drive latch for engaging with a drive pawl between the teeth of the drive gearwheel and is articulated on a pivoting arm.

8. End cutters according to claim 6, wherein a blocking latch attached to a retaining arm engages in a sprung manner between the teeth of the drive gearwheel.

9. End cutters according to claim 6, wherein a drive mechanism can be coupled to one end of the drive shaft.

10. End cutters according to claim 5, wherein the drive device includes a drive latch for engaging with a drive pawl between the teeth of the drive gearwheel and is articulated on a pivoting arm.

11. End cutters according to claim 10, wherein the drive pawl engages in a positively-locking manner in the intermediate toothed region of the drive gearwheel.

12. End cutters according to claim 11, wherein a blocking latch attached to a retaining arm engages in a sprung manner between the teeth of the drive gearwheel.

13. End cutters according to claim 11, wherein a drive mechanism can be coupled to one end of the drive shaft.

14. End cutters according to claim 10, wherein a blocking latch attached to a retaining arm engages in a sprung manner between the teeth of the drive gearwheel.

15. End cutters according to claim 10, wherein a drive mechanism can be coupled to one end of the drive shaft.

16. End cutters according to claim 5, wherein a blocking latch attached to a retaining arm engages in a sprung manner between the teeth of the drive gearwheel.

17. End cutters according to claim 16, wherein a drive mechanism can be coupled to one end of the drive shaft.

18. End cutters according to claim 5, wherein a drive mechanism can be coupled to one end of the drive shaft.

19. End cutters according to claim 4, wherein a drive mechanism can be coupled to one end of the drive shaft.

20. End cutters according to claim 19, wherein the drive mechanism is a control wheel.

21. End cutters according to claim 19, wherein the drive mechanism is a motor.

* * * * *